W. E. NEWSOM.
KETTLE COVER.
APPLICATION FILED JULY 2, 1913.
1,126,066.
Patented Jan. 26, 1915.
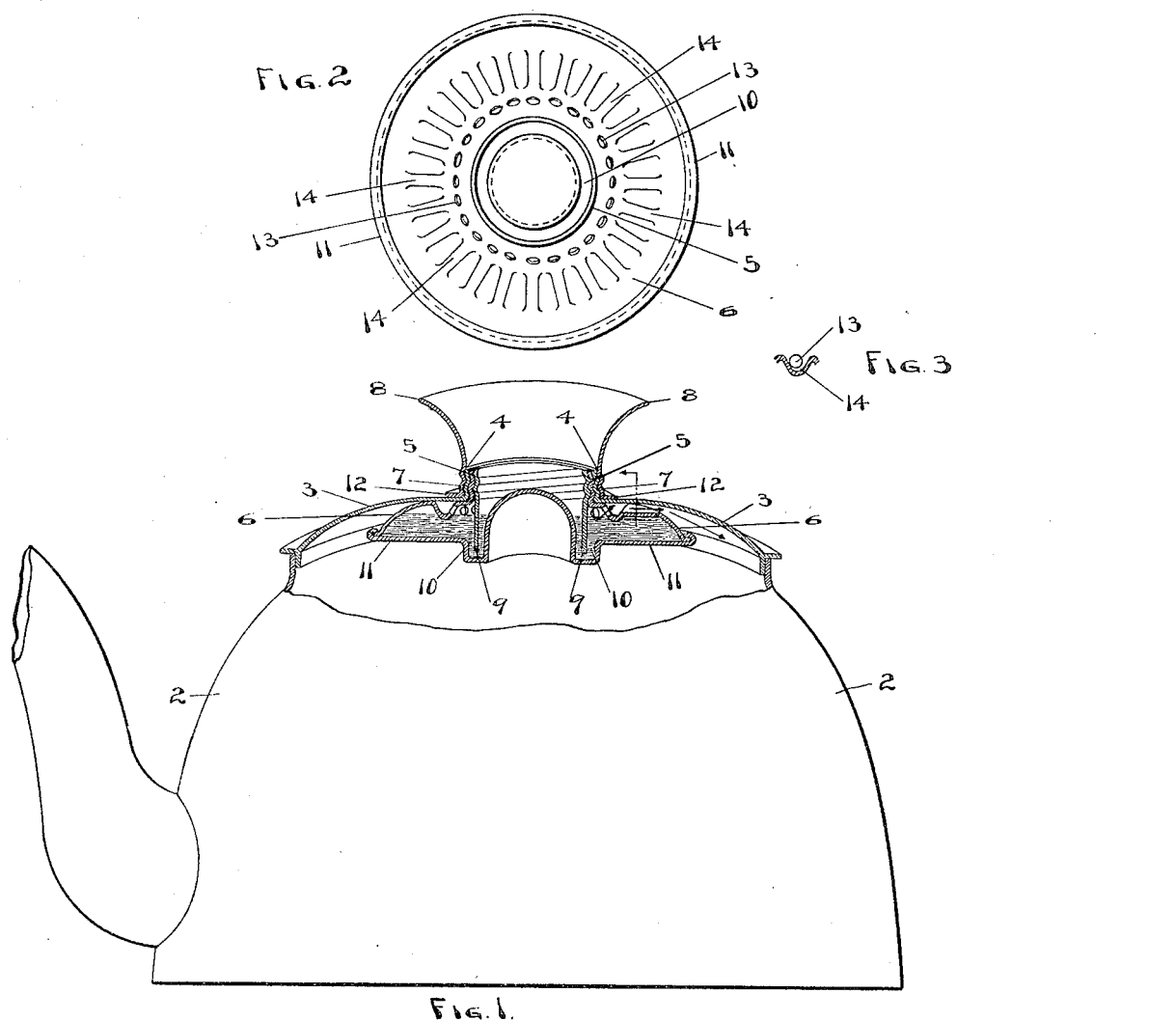
WITNESSES:
C. F. Blake
N. D. Haberlin.
INVENTOR
Willie E. Newsom.
BY
Peter Haberlin
ATTORNEY

UNITED STATES PATENT OFFICE.

WILLIE E. NEWSOM, OF PORTLAND, OREGON.

KETTLE-COVER.

1,126,066. Specification of Letters Patent. Patented Jan. 26, 1915.

Application filed July 2, 1913. Serial No. 777,067.

*To all whom it may concern:*

Be it known that I, WILLIE E. NEWSOM, a citizen of the United States, residing at Portland, in the county of Multnomah and State of Oregon, have invented a certain new and useful Improvement in Kettle-Covers, of which the following is a specification.

The object of my invention is to provide a mechanism of this kind that is simple in construction, durable, and inexpensive in manufacture by reason of its simplicity.

The invention relates to attachments in covers for tea-kettles which serve as a means for guiding the water into kettles as well as serving as a seal to prevent steam from escaping and thereby burning the person filling the kettle.

Other objects and advantages of my invention will be made clearly apparent in the following specification taken in connection with the accompanying drawing which forms part of this application, in which:—

Figure 1 is a vertical section through a tea-kettle and cover showing my invention (also in section) attached thereto:—Fig. 2 is a top plan view of my invention removed from the cover, and Fig. 3 is a cross-section through one of the corrugations in same.

Now referring to the drawing, in which like characters of reference indicate like parts:—The numeral 2, indicates an ordinary tea-kettle on which is placed a cover 3, with annular lip 4, integral therewith; said annular lip being threaded to receive the threaded portion 5, of the top portion 6, of the trap on the inside of said lip, and the threaded portion 7, on the outside of said lip.

Registering with the inside of the threaded portion 5, of top 6, of the trap is a tube 9, with the upper end thereof threaded and the lower end passing into annular chamber 10, which is formed in the bottom 11, of the trap; said tube 9 being placed in such relation to the chamber that the lower end thereof is a trifle above the bottom of said chamber in order to allow fluid to pass under said tube for purposes hereinafter set forth.

In order to operate my invention the threaded portion 5, of the trap is screwed into lip 4, of cover 3, until the top portion of said trap comes into contact with the inside surface of said cover; tube 9, is then screwed into said trap until the end of said tube is flush with the top of the threaded portion of the trap and the top of lip 4, after which funnel 8, is screwed over the outside of lip 4, until collar 12, of said funnel rests on the top surface of cover 3.

When my invention is assembled as above described, the water is poured into the mouth of funnel 8, from whence it flows downwardly through tube 9, into chamber 10 and passes upwardly and flushes the trap, then flows outwardly through apertures 13, and into corrugations 14 in the top 6 of the trap and thence downwardly into kettle 2.

It is obvious from the above described construction that steam cannot escape except through the spout of the kettle, as there is always enough fluid in the trap to prevent such escape, and it can be further seen that said kettle may be refilled without danger to the operator of being burned. Another feature of my invention is that the trap is placed wholly within the cover, and that said cover may be laid on a plane surface without the trap riding on such surface; said trap being of less depth than the lower edge of the cover.

My invention may be constructed of any material and made of any size deemed suitable for such a device, and while I have described and illustrated a preferred form of construction and combination of elements deemed suitable for such a device, I desire to include in this application all mechanical equivalents and substitutes that may be fairly considered to come within the scope and purview of my invention as defined in the appended claims.

Having thus fully described my invention so that others skilled in the art to which it appertains, may be enabled to construct and use the same, what I claim and desire to secure by Letters Patent, is:—

1. In a device of the character described, a cover, means integral with said cover to engage a trap, a trap registering with said engaging means, a depressed annular chamber forming part of said trap, means to allow liquid to pass out of said trap, a tube screwed within said trap to a predetermined depth, and a funnel to receive fluid screwed to the cover, substantially as set forth.

2. In a device of the character described, a cover with a threaded annular lip, a trap consisting of a top portion and a bottom portion, corrugations in said top portion which register with the inside surface of said cover, a depressed annular chamber in the bottom portion of said trap, a tube screwed into said top portion and passing downwardly into the chamber of said bottom portion to a predetermined depth, a funnel with a flaring mouth at one end thereof and a threaded portion having a collar at its opposite end, said collar registering with the top surface of said cover when said funnel is screwed to the annular lip by means of said threaded portion, and apertures in the top portion of said trap through which fluid passes into the kettle when said trap is flushed, substantially as described.

In testimony that I claim the foregoing as my own, I hereunto affix my signature in the presence of two subscribing witnesses.

WILLIE E. NEWSOM.

Witnesses:
PETER HABERLIN,
J. O. HALL.

Copies of this patent may be obtained for five cents each, by addressing the "Commissioner of Patents, Washington, D. C."